United States Patent
Oku et al.

(10) Patent No.: US 10,480,693 B2
(45) Date of Patent: Nov. 19, 2019

(54) THREADED JOINT FOR STEEL PIPES

(71) Applicants: NIPPON STEEL & SUMITOMO METAL CORPORATION, Tokyo (JP); VALLOUREC OIL AND GAS FRANCE, Aulnoye-Aymeries (FR)

(72) Inventors: Yousuke Oku, Amagasaki (JP); Tatsuya Yamamoto, Wakayama (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 349 days.

(21) Appl. No.: 15/317,418

(22) PCT Filed: Jun. 19, 2015

(86) PCT No.: PCT/JP2015/003093
§ 371 (c)(1),
(2) Date: Dec. 9, 2016

(87) PCT Pub. No.: WO2015/194193
PCT Pub. Date: Dec. 23, 2015

(65) Prior Publication Data
US 2017/0108151 A1  Apr. 20, 2017

(30) Foreign Application Priority Data
Jun. 20, 2014  (JP) ................. 2014-127671

(51) Int. Cl.
*F16L 15/06*  (2006.01)
*E21B 17/043*  (2006.01)
(Continued)

(52) U.S. Cl.
CPC ............ *F16L 15/06* (2013.01); *E21B 17/042* (2013.01); *E21B 17/043* (2013.01); *F16L 15/001* (2013.01); *F16L 15/004* (2013.01)

(58) Field of Classification Search
CPC .......... E21B 17/042; F16L 15/04; F16L 15/06
(Continued)

(56) References Cited

U.S. PATENT DOCUMENTS 5,066,052 A * 11/1991 Read .................. F16L 15/04
285/334
5,964,486 A * 10/1999 Sinclair .................. F16L 15/004
285/331

(Continued)

FOREIGN PATENT DOCUMENTS

JP  2007-504420  3/2007
JP  2008-512617  4/2008
(Continued)

*Primary Examiner* — David Bochna
(74) *Attorney, Agent, or Firm* — Clark & Brody

(57) ABSTRACT

A threaded joint is constructed of a pin and a box. The pin includes, in order from a tubular body having the pin toward the free end thereof: a male threaded portion and a lip portion including a sealing surface. The box includes: a female threaded portion corresponding to the male threaded portion of the pin; and a recessed portion corresponding to the lip portion, the recessed portion including a sealing surface. The lip portion includes, in order from a male threaded portion toward the free end of the pin: a neck portion; and a sealing head portion including the sealing surface. The maximum outside diameter of the region of the sealing surface in the sealing head portion is larger than an outside diameter of the neck portion at a boundary between the neck portion and the male threaded portion.

16 Claims, 9 Drawing Sheets

(51) Int. Cl.
*E21B 17/042* (2006.01)
*F16L 15/00* (2006.01)

(58) Field of Classification Search
USPC .................................................. 285/333, 334
See application file for complete search history.

(56) References Cited

U.S. PATENT DOCUMENTS

| | | | | |
|---|---|---|---|---|
| 7,699,361 | B2* | 4/2010 | Verger | F16L 15/004 |
| | | | | 285/333 |
| 7,717,478 | B2 | 5/2010 | Reynolds, Jr. | |
| 7,883,120 | B2* | 2/2011 | Fontaine | F16L 15/001 |
| | | | | 285/333 |
| 2002/0021006 | A1* | 2/2002 | Mallis | F16L 15/004 |
| | | | | 285/334 |
| 2004/0195835 | A1* | 10/2004 | Noel | F16L 15/002 |
| | | | | 285/333 |
| 2005/0236834 | A1* | 10/2005 | Curley | F16L 15/007 |
| | | | | 285/333 |
| 2006/0261595 | A1* | 11/2006 | Verger | F16L 15/004 |
| | | | | 285/334 |
| 2007/0035130 | A1* | 2/2007 | Hashem | F16L 15/003 |
| | | | | 285/333 |
| 2007/0102927 | A1* | 5/2007 | Dubedout | F16L 15/004 |
| | | | | 285/382 |
| 2007/0132236 | A1* | 6/2007 | Dubedout | F16L 15/004 |
| | | | | 285/333 |
| 2007/0176422 | A1* | 8/2007 | Dubedout | F16L 15/004 |
| | | | | 285/333 |
| 2008/0265575 | A1* | 10/2008 | Charvet-Quemin | |
| | | | | F16L 15/004 |
| | | | | 285/331 |
| 2010/0102553 | A1* | 4/2010 | Patureau | F16L 15/004 |
| | | | | 285/334 |
| 2010/0171305 | A1* | 7/2010 | Roussie | E21B 17/042 |
| | | | | 285/333 |
| 2010/0181763 | A1 | 7/2010 | Mallis et al. | |
| 2014/0262213 | A1* | 9/2014 | Delange | F16L 15/003 |
| | | | | 166/207 |
| 2015/0145247 | A1* | 5/2015 | Zhu | E21B 17/042 |
| | | | | 285/333 |

FOREIGN PATENT DOCUMENTS

| | | |
|---|---|---|
| JP | 2009-503402 | 1/2009 |
| JP | 2010-514992 | 5/2010 |
| JP | 2010-520981 | 6/2010 |
| JP | 2011-501075 | 1/2011 |
| JP | 2014-105731 | 6/2014 |
| WO | 2004/106797 | 12/2004 |

* cited by examiner

THREADED JOINT FOR STEEL PIPES

TECHNICAL FIELD

The present invention relates to a threaded joint for use in connecting steel pipes.

BACKGROUND ART

In oil wells, natural gas wells, and the like (hereinafter also collectively referred to as "oil wells"), steel pipes referred to as oil country tubular goods (OCTG) such as casings and tubings are used for extraction of underground resources. The steel pipes are sequentially connected to each other, and threaded joints are used for the connection.

Threaded joints for steel pipes are classified into two types: coupling-type joints and integral-type joints. A coupling-type threaded joint is constituted by a pair of tubular goods that are to be connected to each other, of which one is a steel pipe and the other is a coupling. In this case, the steel pipe includes male threaded portions formed on the outer peripheries at both ends thereof, and the coupling includes female threaded portions formed on the inner peripheries at both ends thereof. Thus, the steel pipe and the coupling are connected to each other. An integral-type threaded joint is constituted by a pair of steel pipes as tubular goods that are to be connected to each other, without a separate coupling being used. In this case, each steel pipe includes a male threaded portion formed on the outer periphery at one end thereof and a female threaded portion formed on the inner periphery at the other end thereof. Thus, the one steel pipe and the other steel pipe are connected to each other.

In general, the joint portion at the tubular end where a male threaded portion is disposed is referred to as a pin because it includes an element that is inserted into a female threaded portion. On the other hand, the joint portion at the tubular end where a female threaded portion is disposed is referred to as a box because it includes an element that receives a male threaded portion. Pins and boxes both have a tubular shape because they are constituted by end portions of tubular goods.

Threaded joints for steel pipes are configured such that the male threaded portion of the pin is screwed onto the female threaded portion of the box and accordingly the male threaded portion and the female threaded portion, each being a tapered threaded portion, engage in intimate contact with each other. Basically, this thread seal produced by the engagement and intimate contact of the male threaded portion and the female threaded portion ensures the sealing performance of threaded joints.

In recent years, some drilling techniques such as horizontal drilling and directional drilling have been increasingly employed in oil wells, so that threaded joints are more likely to be subjected to high torque loads. For this reason, there is an increasing demand for threaded joints capable of providing high torque resistance performance. Furthermore, oil well environments in which the above-mentioned drilling techniques are applied are harsh environments with high temperatures and high pressures. To address such harsh environments, threaded joints need to be capable of providing not only high torque resistance performance but also high sealing performance.

In general, coupling-type threaded joints are widely used because they exhibit better sealing performance than integral-type threaded joints.

An example of threaded joints capable of providing high torque resistance performance is a threaded joint employing tapered threads of the dovetail type also referred to as wedge threads. Threaded joints employing wedge threads are configured as follows. The thread width of the male threaded portion gradually decreases along the thread helix in the right-hand screw direction, and the groove width of the corresponding female threaded portion also gradually decreases along the thread helix in the right-hand screw direction. Both the load flanks and the stabbing flanks have negative flank angles, and at the completion of fastening thread, the stabbing flanks are in contact with each other and the load flanks are in contact with each other, whereby the threaded portions as a whole firmly engage with each other. Furthermore, in the fastened state, crests and roots of the threaded portions are in intimate contact with each other. Thus, threaded joints employing wedge threads are capable of providing high torque resistance performance while ensuring sealing performance.

However, in the case of the thread seal using wedge threads, a sufficient seal cannot be formed unless the male threaded portion and the female threaded portion engage in intimate contact with each other by strictly setting manufacturing tolerances such as the radius of curvature for each of the threaded portions. Furthermore, the thread seal can be formed substantially only in the region of complete threads, and therefore, if a threaded joint is designed to have a relatively long incomplete thread region, sealing performance as desired may not be obtained. In particular, when an internal pressure or external pressure is excessively applied, the highly pressurized fluid may penetrate into gaps at the thread seal, thereby incurring the risk of leakage.

As described above, there is a limit to sealing performance that can be ensured solely by the thread seal. For this reason, attempts have hitherto been made to ensure sealing performance against internal and external pressures by providing an internal seal and an external seal separately from the thread seal. The internal seal is formed by contact between a sealing surface of the pin disposed on a free end region thereof, forward of the male threaded portion of the pin, and a sealing surface of the box corresponding thereto. The external seal is formed by contact between a sealing surface of the pin disposed on a region rearward of the male threaded portion thereof, and a sealing surface of the box corresponding thereto.

For example, United States Patent Application Publication No. 2010/0181763 (Patent Literature 1) and International Publication No. WO2004/106797 (Patent Literature 2) each disclose a threaded joint having an internal seal and an external seal in addition to a thread seal. Of these threaded joints of the patent literatures, the threaded joint of Patent Literature 2 is configured such that, in a fastened state, clearances are provided between the crests and the roots of the threaded portions. These clearances allow an excess of the lubricant (hereinafter also referred to as "dope"), applied for fastening thread, to accumulate therein, thereby contributing to prevention of an abnormal increase in the dope pressure.

It is true that the conventional threaded joints disclosed in Patent Literatures 1 and 2 exhibit improved sealing performance against pressures. However, threaded joints having an external seal have a reduced cross sectional area of the critical section of the pin (the cross section in the rearmost end region of the male threaded portion, i.e., the cross section in the male threaded portion closest to the tubular body), and therefore have a reduced resistance to tensile forces. For this reason, it is not desirable to provide an external seal from the standpoint of the threaded joint strength.

In the case of threaded joints having an internal seal, when an excessively high external pressure has been applied thereto, plastic deformation occurs in the region of the sealing surface of the pin in the free end region thereof because the region of the sealing surface does not have a sufficient wall thickness. As a result, there is a risk that sealing performance may not be exhibited.

CITATION LIST

Patent Literature

Patent Literature 1: United States Patent Application Publication No. 2010/0181763
Patent Literature 2: International Publication No. WO2004/106797

SUMMARY OF INVENTION

Technical Problem

One serious problem that a threaded joint may experience is the occurrence of fluid leaks when an excessively high pressure (internal pressure or external pressure) has been applied. In the case of threaded joints employing wedge threads, in particular, it is important to reliably ensure the sealing performance against pressures.

An object of the present invention is to provide a threaded joint for steel pipes having the following characteristics: being capable of reliably providing high sealing performance while maintaining high torque resistance performance of wedge threads, i.e., dovetail-shaped tapered threads.

Solution to Problem

A threaded joint for steel pipes according to an embodiment of the present invention includes a tubular pin and a tubular box, the pin and the box being fastened by screwing the pin onto the box.

The pin includes, in order from a tubular body having the pin toward a free end thereof: a tapered male threaded portion with dovetail threads; and a lip portion including a sealing surface.

The box includes: a tapered female threaded portion with dovetail threads corresponding to the male threaded portion of the pin; and a recessed portion corresponding to the lip portion, the recessed portion including a sealing surface.

The lip portion includes, in order from the male threaded portion toward the free end of the pin: a neck portion; and a sealing head portion including the sealing surface.

The sealing surface is disposed on a region in the sealing head portion, the region having a maximum outside diameter that is larger than an outside diameter of the neck portion at a boundary between the neck portion and the male threaded portion.

The above threaded joint may be configured such that the sealing head portion has an inside diameter that is smaller than an inside diameter of the tubular body. When this configuration is employed, it is preferred that an inner peripheral surface of the lip portion includes, in order from the free end of the pin: a tapered surface increasing in diameter toward the free end; and a cylindrical surface that is continuous with the tapered surface, and that the cylindrical surface has a length along the pipe axis of at least 3 mm, the length extending from a boundary between the tapered surface and the cylindrical surface. Alternatively, the above threaded joint may be configured such that the sealing head portion has an inside diameter that is larger than an inside diameter of the tubular body.

The above threaded joint may preferably be configured as follows. In a fastened state, clearances are provided in at least one of the following: between crests of the male threaded portion and roots of the female threaded portion; and between roots of the male threaded portion and crests of the female threaded portion.

The above threaded joint may preferably be configured as follows. The region of the sealing surface in the sealing head portion has a wall thickness at a position of the maximum outside diameter, the wall thickness being in a range of 55% to 80% of a wall thickness of the tubular body, and the neck portion has a minimum wall thickness in a range of 45% to 70% of the wall thickness of the tubular body.

The above threaded joint may preferably be configured as follows. In a fastened state, a clearance between an end face of the lip portion and an end of the recessed portion on a tubular body side of the box is in a range of 0.1 mm to 3.0 mm.

The above threaded joint may preferably be configured as follows. The male threaded portion and the female threaded portion each have a taper angle in a range of 1° to 5° with respect to the pipe axis.

The above threaded joint may preferably be configured as follows. The neck portion has an outer peripheral surface, the outer peripheral surface being a cylindrical surface, and the sealing head portion has an outer peripheral surface, the outer peripheral surface including: a tapered surface that is continuous with the outer peripheral surface of the neck portion and increases in diameter at an angle in a range of 5° to 20° with respect to the pipe axis; a cylindrical surface that is continuous with the tapered surface; and the sealing surface, the sealing surface including a curved surface that is continuous with the cylindrical surface and a tapered surface that decreases in diameter toward the free end of the pin.

The above threaded joint may preferably be configured as follows. The sealing surface of the lip portion includes a tapered surface, the tapered surface having a taper angle in a range of 3° to 10° with respect to the pipe axis.

The above threaded joint may preferably be configured as follows. The male threaded portion and the female threaded portion each have a thread height in a range of 1.0 mm to 3.0 mm.

Advantageous Effects of Invention

A threaded joint for steel pipes according to the present invention has the following significant advantages: being capable of reliably providing high sealing performance while maintaining high torque resistance performance of wedge threads, i.e., dovetail-shaped tapered threads.

DESCRIPTION OF EMBODIMENTS

Figure 1:
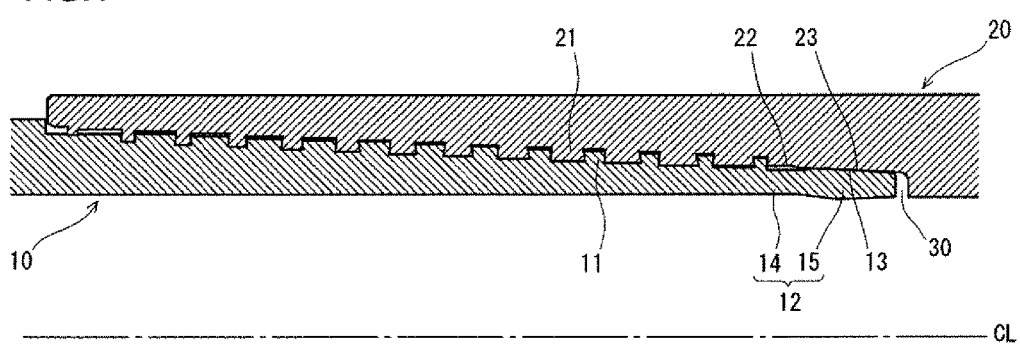
FIG. 1 is a longitudinal sectional view of a threaded joint for steel pipes according to a first embodiment.

The present inventors had realized that conventional threaded joints that employ the thread seal using wedge threads but do not have an internal or external seal pose a problem with regard to sealing performance particularly against external pressures. This is based on numerical simulations and analyses using the elasto-plastic finite element method, performed by the present inventors, and evaluations of the results. In view of the above, the present inventors firstly contemplated improving the sealing performance against external pressure by providing an external seal and further an internal seal as with the threaded joints disclosed in Patent Literatures 1 and 2.

However, as described above, providing an external seal results in decreasing the tensile force resistance of the threaded joint. In view of this, the present inventors conceived of the idea of actively utilizing the internal seal so that it can provide the sealing performance against external pressure as well while maintaining its sealing performance against internal pressure, and they contemplated embodiments thereof.

The pin is provided with a lip portion which extends from the male threaded portion along the axis of the pipe. A sealing surface is provided on the outer periphery of the lip portion to constitute an internal seal. External pressure entering from outside of the threaded joint penetrates through the threaded portions and reaches a location near the sealing surface in the lip portion of the pin. The external pressure that has reached the lip portion of the pin acts to induce radial contraction of the lip portion and thus to loosen the contact between the sealing surfaces.

The present inventors appreciated that an effective way to prevent the phenomenon is to enhance the stiffness of the lip portion of the pin so as to inhibit the radially inward deformation of the lip portion, and therefore they directed their attention to the geometry of the lip portion.

One simple method for enhancing the stiffness of the lip portion is to enlarge the outside diameter of the lip portion so that the lip portion has a larger wall thickness. Certainly, a larger wall thickness of the lip portion leads to improvement in the sealing performance against external pressure. However, in the pin, if the outside diameter of the lip portion is excessively enlarged and the wall thickness thereof is excessively increased, then the start point for thread machining of the male threaded portion will be shifted to a position closer to the outer periphery of the pin as a result of the enlargement of the outside diameter of the lip portion.

Consequently, the thread height will have to be lowered or the length of the threaded portion will have to be shortened from the length as initially designed. As a result, the high torque resistance performance that can be achieved by wedge threads may be lost.

Furthermore, if it is desired to maintain the wall thickness of the region of the sealing surface in the box when the outside diameter of the lip portion is enlarged, then the outside diameter of the box (e.g., a coupling) has to be increased. When this is the case, the clearance between an inner threaded joint and an outer threaded joint in the well, which has a multiple wall structure, will be significantly reduced. Thus, it is preferred that the outside diameter of the box not be increased.

If the outside diameter of the box is maintained when the outside diameter of the lip portion of the pin is enlarged to increase the wall thickness of the lip portion, then the wall thickness of the region of the sealing surface in the box has to be reduced. In such a case, even the sealing performance against internal pressure may be decreased.

In view of the above, the present inventors have come to the conclusion that optimizing the geometry of the lip portion of the pin and the wall thickness thereof is effective at maintaining the high torque resistance performance of wedge threads while reliably ensuring high sealing performance.

The threaded joint of the present invention has been completed on the basis of results of studies based on the above concepts. Embodiments of the threaded joint for steel pipes according to the present invention are described below.

[First Embodiment]

Figure 2:
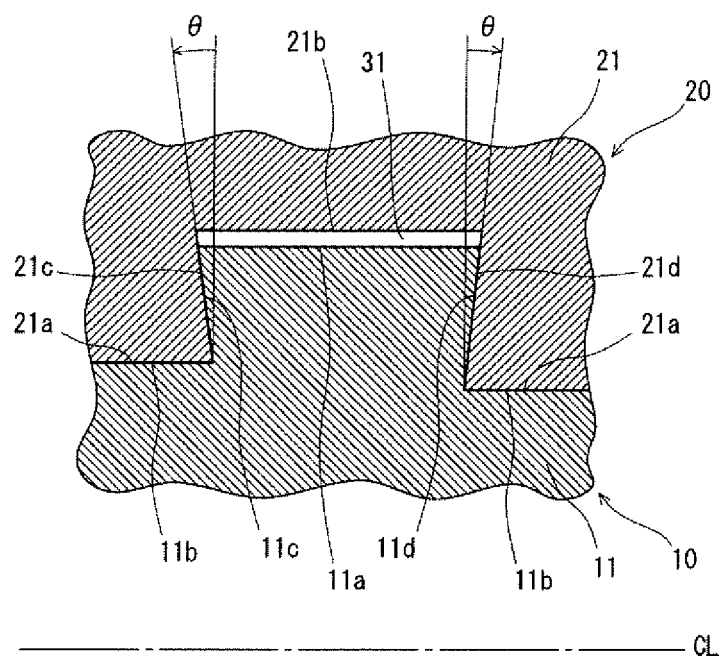
FIG. 2 is a longitudinal sectional view showing a threaded portion in the threaded joint for steel pipes according to the first embodiment.
Figure 3:
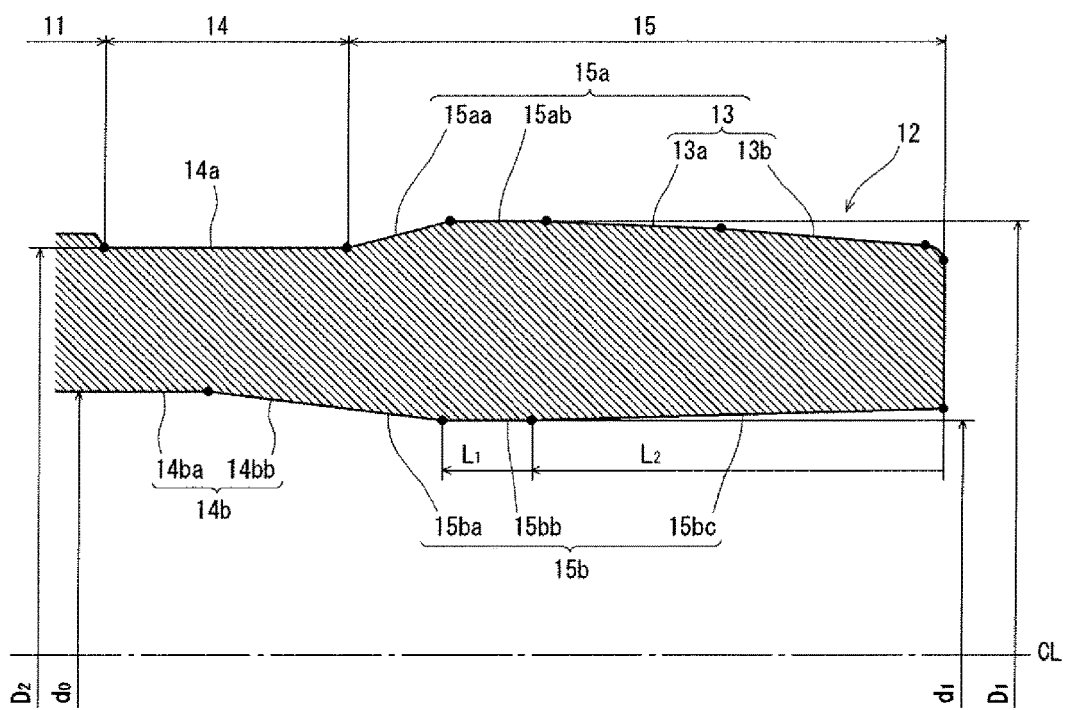
FIG. 3 is a longitudinal sectional view showing an example of a free end region of the pin in the threaded joint for steel pipes according to the first embodiment.

FIG. 1 is a longitudinal sectional view of a threaded joint for steel pipes according to a first embodiment. FIG. 2 is a longitudinal sectional view showing a threaded portion in the threaded joint for steel pipes. FIG. 3 is a longitudinal sectional view showing an example of a free end region of the pin in the threaded joint for steel pipes. As shown in FIGS. 1 to 3, the threaded joint of the first embodiment is a coupling-type threaded joint employing wedge threads (dovetail-shaped tapered threads) and is constructed of a pin 10 and a box 20.

The pin 10 includes, in order from the tubular body having the pin 10 toward the free end thereof: a male threaded portion 11; and a lip portion 12. The lip portion 12 extends continuously from the male threaded portion 11 along the pipe axis CL. The lip portion 12 is composed of, in order toward the free end of the pin 10: a neck portion 14; and a sealing head portion 15. The sealing head portion 15 includes a sealing surface 13.

The box 20 includes, in order from the free end of the box 20 toward the tubular body thereof: a female threaded portion 21; and a recessed portion 22. The female threaded portion 21 is provided to correspond to the male threaded portion 11 of the pin 10. The recessed portion 22 is provided to correspond to the lip portion 12 of the pin 10. The recessed portion 22 includes a sealing surface 23 corresponding to the sealing surface 13 of the pin 10.

The neck portion 14 of the pin 10 connects the male threaded portion 11 to the sealing head portion 15. The outer peripheral surface 14a of the neck portion 14 is a cylindrical surface (hereinafter also referred to as "neck outer peripheral cylindrical surface") whose central axis is the pipe axis CL. In the threaded joint shown in FIG. 3, the inner peripheral surface 14b of the neck portion 14 includes a cylindrical surface 14ba (hereinafter also referred to as "neck inner peripheral cylindrical surface") and tapered surface 14bb (hereinafter also referred to as "neck inner peripheral tapered surface"), with the former being located closer to the male threaded portion 11 and defining an inside diameter identical with that of the tubular body and the latter being located closer to the sealing head portion 15 and decreasing in diameter toward the free end of the pin 10. Alternatively, the neck inner peripheral cylindrical surface 14*ba* may not be provided.

The outer peripheral surface 15*a* of the sealing head portion 15 includes a tapered surface 15*aa* (hereinafter also referred to as a "head outer peripheral inside tapered surface") which is continuous with the outer peripheral surface 14*a* of the neck portion 14 and increases in diameter toward the free end of the pin 10. A cylindrical surface 15*ab* (hereinafter also referred to as "head outer peripheral cylindrical surface") whose central axis is the pipe axis CL is continuous with the head outer peripheral inside tapered surface 15*aa*. The sealing surface 13 is continuous with the head outer peripheral cylindrical surface 15*ab*. The sealing surface 13 is composed of, for example, a curved surface 13*a* (hereinafter also referred to as "seal curved surface") and a tapered surface 13*b* (hereinafter also referred to as "seal tapered surface"). The seal curved surface 13*a* is a surface that corresponds to a peripheral surface of a solid of revolution that can be obtained by rotating a curved line such as an arc about the pipe axis CL. The seal tapered surface 13*b* is a tapered surface which decreases in diameter toward the free end of the pin 10.

In the threaded joint shown in FIG. 3, the inner peripheral surface 15*b* of the sealing head portion 15 includes a tapered surface 15*ba* (hereinafter also referred to as "head inner peripheral inside tapered surface") that is continuous with the neck inner peripheral tapered surface 14*bb* at the same taper angle. A cylindrical surface 15*bb* (hereinafter also referred to as "head inner peripheral cylindrical surface") whose central axis is the pipe axis CL is continuous with the head inner peripheral inside tapered surface 15*ba*. A tapered surface 15*bc* (hereinafter also referred to as "head inner peripheral foremost tapered surface") which slightly increases in diameter toward the free end of the pin 10 is continuous with the head inner peripheral cylindrical surface 15*bb*. Alternatively, the head inner peripheral inside tapered surface 15*ba* may not be provided. In such a case, the head inner peripheral cylindrical surface 15*bb* extends into the region of the neck portion 14 to be continuous with the neck inner peripheral tapered surface 14*bb*.

The maximum outside diameter $D_1$ of the region of the sealing surface 13 in the sealing head portion 15 is larger than an outside diameter $D_2$ of the neck portion 14 at a boundary between the neck portion 14 and the male threaded portion 11. The boundary between the neck portion 14 and the male threaded portion 11 corresponds to the thread machining start point of the male threaded portion 11. By virtue of the aforementioned configuration, in the lip portion 12 of the pin 10, it is possible to increase the wall thickness of the sealing head portion 15, which has the sealing surface 13, without the need to shift the thread machining start point of the male threaded portion 11 to a position closer to the outer periphery of the pin 10.

In the threaded joint of the first embodiment in particular, the sealing head portion 15 has an inside diameter $d_1$ smaller than the inside diameter do of the tubular body. The inside diameter $d_1$ of the sealing bead portion 15 is smallest in the region of the head inner peripheral cylindrical surface 15*bb*. This can be readily accomplished by swaging the free end region of the pin 10 in advance. The head inner peripheral foremost tapered surface 15*bc* and the head inner peripheral cylindrical surface 15*bb* are formed by machining after swaging. The neck inner peripheral tapered surface 14*bb* is an as-swaged surface or a machined surface depending on the specifications. Since the inside diameter $d_1$ of the sealing head portion 15 is smaller than the inside diameter do of the tubular body, the wall thickness of the sealing head portion 15 can be sufficiently increased without the need to enlarge the outside diameter of the sealing head portion 15 to a great extent.

The male threaded portion 11 of the pin 10 and the female threaded portion 21 of the box 20 are tapered threaded portions with dovetail threads (wedge threads) that can engage with each other. The load flanks lie of the male threaded portion 11 and the load flanks 21*c* of the female threaded portion 21, and the stabbing flanks 11*d* of the male threaded portion 11 and the stabbing flanks 21*d* of the female threaded portion 21, each have a negative flank angle θ in a range of about 1° to 10° with respect to the pipe axis CL. The male threaded portion 11 and the female threaded portion 21 are threadedly engageable with each other, and in a fastened state, the load flanks 11*c* and the load flanks 21*c* are in intimate contact with each other, and the stabbing flanks 11*d* and the stabbing flanks 21*d* are in intimate contact with each other, so that the threaded portions as a whole firmly engage with each other. The sealing surface 13 of the pin 10 and the sealing surface 23 of the box 20 are brought into contact with each other by the screwing of the pin 10 and, in a fastened state, they engage in intimate contact with each other to have an interference fit, so as to form an internal seal by surface-to-surface contact.

Thus, with the threaded joint according to the first embodiment, it is possible to maintain high torque resistance performance because it employs wedge threads.

Moreover, the sealing head portion 15, which has the sealing surface 13, has an increased wall thickness, and therefore the region of the sealing surface 13 has increased stiffness. As a result, even if external pressure has reached a location near the sealing surface 13 of the lip portion 12, the internal seal effected by the sealing surface 13 provides high sealing performance. This is due to the fact that radially inward deformation is inhibited in the region of the sealing surface 13. It is noted that the internal seal provides, as its inherent function, high sealing performance against internal pressure as well.

Furthermore, there is no need to shift the thread machining start point of the male threaded portion 11 to a position closer to the outer periphery of the pin 10, and therefore it is possible to ensure a sufficient length of the threaded portion while maintaining the high thread height. As a result, the high torque resistance performance of wedge threads is sufficiently ensured.

The following are additional descriptions of preferred embodiments of the threaded joint according to the first embodiment.

In the threaded joint of the first embodiment, clearances 31 are provided between the crests 11*a* of the male threaded portion 11 and the roots 21*b* of the female threaded portion 21 in a fastened state. These clearances 31 prevent an abnormal increase in the dope pressure. On the other hand, the roots 11*b* of the male threaded portion 11 are in contact with the crests 21*a* of the female threaded portion 21. It is to be noted that clearances may be provided both between the crests 11*a* of the male threaded portion 11 and the roots 21*b* of the female threaded portion 21 and between the roots 11*b* of the male threaded portion 11 and the crests 21*a* of the female threaded portion 21. Alternatively, clearances may be provided solely between the roots 11*b* of the male threaded portion 11 and the crests 21*a* of the female threaded portion 21. A preferred range of each clearance is from 0.05 to 0.5 mm. Within this range, a sufficient height of engagement between the male threaded portion 11 and the female threaded portion 21 can be ensured, so that high torque performance can be provided.

The taper angles of the male threaded portion 11 and the female threaded portion 21 are each preferably in a range of 1° to 5° with respect to the pipe axis CL. If the taper angles of the threaded portions are too large, the lengths of the threaded portions are excessively shortened and therefore the torque resistance performance will be decreased. On the other hand, if the taper angles of the threaded portions are too small, the lengths of the threaded portions are excessively elongated and therefore the cost of manufacturing will be increased. A more preferred lower limit of the taper angles is 1.5° and a still more preferred lower limit thereof is 2°. A more preferred upper limit of the taper angles is 4°.

The thread heights of the male threaded portion 11 and the female threaded portion 21 are each preferably in a range of 1.0 mm to 3.0 mm. If the thread heights are too high, the cost of manufacturing will be increased, and in addition, the sealing performance against internal pressure will be decreased because of the reduced wall thickness of the box 20. On the other hand, if the thread heights are too low, the torque resistance performance will be decreased. A more preferred lower limit of the thread heights is 1.2 mm and a still more preferred lower limit thereof is 1.5 mm.

In the sealing head portion 15 which constitutes the lip portion 12 of the pin 10, the wall thickness of the region of the sealing surface 13 at the position of the maximum outside diameter is preferably in a range of 55% to 80% of the wall thickness of the tubular body. If the wall thickness of the region of the sealing surface 13 is too thin, the sealing performance against external pressure cannot be ensured because the stiffness is decreased. On the other hand, if the wall thickness of the region of the sealing surface 13 is too large, the stiffness is increased. However, if the increase of the wall thickness of the region of the sealing surface 13 is to be accomplished by enlarging the outside diameter of the sealing head portion 15, then the diameter of the sealing surface 23 of the box 20 is enlarged, and the resulting decrease in the wall thickness of the box 20 may cause a decrease in sealing performance against internal pressure. If the increase of the wall thickness of the region of the sealing surface 13 is to be accomplished by reducing the inside diameter of the sealing head portion 15, then it is necessary to limit the inside diameter of the sealing head portion 15, particularly the inside diameter of the head inner peripheral cylindrical surface 15*bb*, to the inside diameter required by API specifications.

In the meantime, the neck portion 14 which constitutes the lip portion 12 of the pin 10 preferably has a minimum wall thickness in a range of 45% to 70% of the wall thickness of the tubular body. If the minimum wall thickness of the neck portion 14 is too thin, the sealing performance against external pressure cannot be ensured because the stiffness of the neck portion 14 is decreased. On the other hand, if the minimum wall thickness of the neck portion 14 is too large, the thread machining start point is to be shifted to a position closer to the outer periphery of the pin 10, and therefore the thread height will have to be lowered or the lengths of the threaded portions will have to be shortened, with the result that the torque resistance performance of wedge threads is not exhibited.

Of all portions of the outer peripheral surface 15*a* of the sealing head portion 15, the head outer peripheral inside tapered surface 15*aa*, which is continuous with the outer peripheral surface 14*a* of the neck portion 14, preferably has a taper angle in a range of 5° to 20° with respect to the pipe axis CL. If the taper angle of the head outer peripheral inside tapered surface 15*aa* is larger, the stiffness of the sealing surface 13 is increased as a result of the increased wall thickness of the sealing head portion 15, but the sealing performance against internal pressure will be decreased because of the reduced wall thickness of the box 20. On the other hand, if the taper angle of the head outer peripheral inside tapered surface 15*aa* is too small, the sealing performance against external pressure will be decreased because a sufficient wall thickness of the region of the sealing surface 13 cannot be provided.

Of all portions of the inner peripheral surfaces 14*b* and 15*b* of the lip portion 12, the head inner peripheral cylindrical surface 15*bb* (including the case in which it extends into the region of the neck portion 14) preferably has a length $L_1$ along the pipe axis CL of at least 3 mm. The length $L_1$ is a length extending from the boundary between the head inner peripheral foremost tapered surface 15*bc* and the head inner peripheral cylindrical surface 15*bb*. The head inner peripheral foremost tapered surface 15*bc* has a length $L_2$ along the pipe axis CL of about 8 to 12 mm. If the length $L_1$ of the head inner peripheral cylindrical surface 15*bb* is too short, the stiffness of the sealing head portion 15 is not sufficiently increased, and therefore the sealing performance against external pressure cannot be ensured. A preferred lower limit of the length $L_1$ is 4 mm. In the meantime, the length $L_1$ is preferably as long as possible. However, the length $L_1$ depends on the degree of swaging. Thus, a preferred upper limit of the length $L_1$ is 15 mm.

The seal tapered surface 13*b* which constitutes the sealing surface 13 of the lip portion 12 preferably has a taper angle in a range of 3° to 10° with respect to the pipe axis CL. If the taper angle of the seal tapered surface 13*b* is larger, the stiffness is decreased in an end portion of the region of the sealing surface 13 as a result of the reduced wall thickness therein, and therefore the sealing performance against external pressure will be decreased. On the other hand, if the taper angle of the seal tapered surface 13*b* is too small, the sealing surfaces 13, 23 slide relative to each other when a tensile load is applied to the threaded joint, so that the contact between them may be lost.

In a fastened state, a clearance 30 is provided between the end face of the lip portion 12 of the pin 10 and the tubular body-side end of the recessed portion 22 of the box 20 (see FIG. 1). The clearance 30 is preferably in a range of 0.1 mm to 3.0 mm. Without the clearance 30, the end face of the pin 10 would inadvertently come into contact with the recessed portion 22 of the box 20 during fastening thread. As a result, the engagement between the male threaded portion 11 and the female threaded portion 21 becomes insufficient, and therefore the torque resistance performance cannot be obtained. On the other hand, if the clearance 30 is too large, turbulence of fluids flowing through the threaded joint can occur in the vicinity of the clearance 30, which can induce erosion.

[Second Embodiment]

Figure 4:
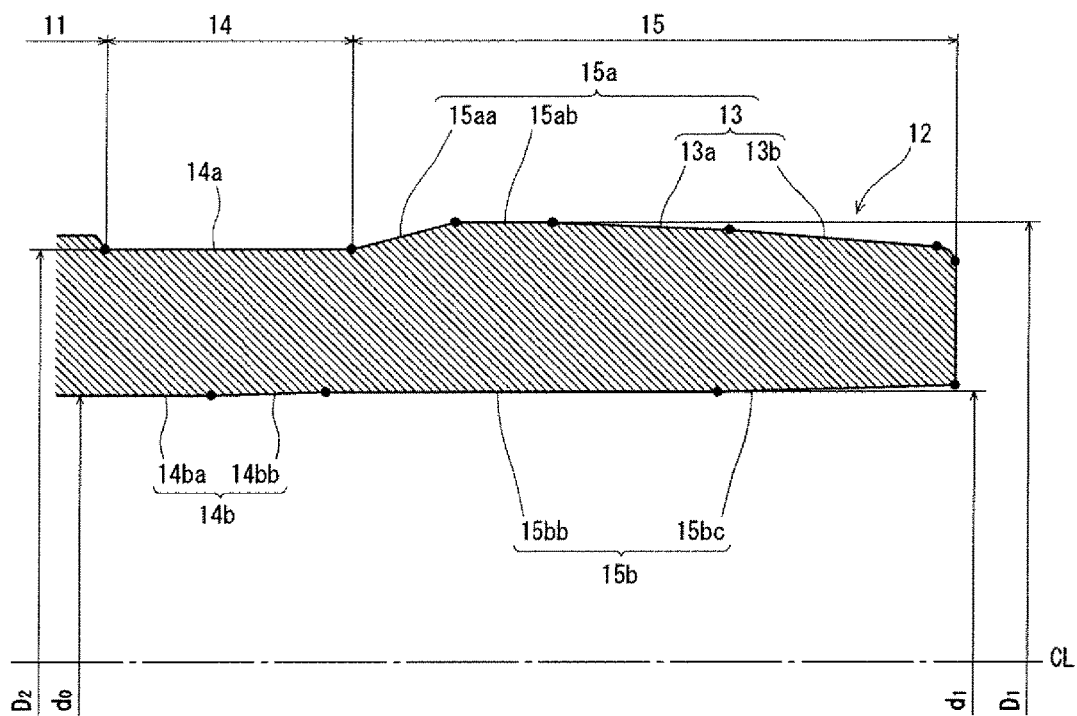
FIG. 4 is a longitudinal sectional view showing an example of a free end region of the pin in a threaded joint for steel pipes according to a second embodiment.

FIG. 4 is a longitudinal sectional view showing an example of a free end region of the pin in the threaded joint for steel pipes according to the second embodiment. The threaded joint according to the second embodiment shown in FIG. 4 is a variation of the threaded joint according to the first embodiment shown in FIGS. 1 to 3, and therefore descriptions redundant to those given in the first embodiment will not be repeated where appropriate.

In the threaded joint according to the second embodiment, the neck inner peripheral tapered surface 14bb, of the inner peripheral surface 14b of the neck portion 14 which constitutes the lip portion 12, is a tapered surface that increases in diameter toward the free end of the pin 10. Thus, the inside diameter $d_1$ of the sealing head portion 15 is larger than the inside diameter do of the tubular body. It is noted however that, in the second embodiment as well similarly to the first embodiment, the maximum outside diameter $D_1$ of the region of the sealing surface 13 in the sealing head portion 15 is larger than an outside diameter $D_2$ of the neck portion 14 at a boundary between the neck portion 14 and the male threaded portion 11. Consequently, the threaded joint of the second embodiment also produces advantageous effects similar to those of the first embodiment described above.

However, in the case of the second embodiment, an increase of the wall thickness of the region of the sealing surface 13 results in an enlargement of the outside diameter of the region of the sealing surface 13. As a result, the diameter of the sealing surface 23 of the box 20 is enlarged, and the resulting decrease in the wall thickness of the box 20 may cause a decrease in sealing performance against internal pressure. In this regard, the first embodiment is more advantageous.

The present invention is not limited to the embodiments described above, and various modifications may be made without departing from the spirit and scope of the present invention. For example, the threaded joints according to the above embodiments may be employed not only as a coupling-type threaded joint but also as an integral-type threaded joint.

EXAMPLES

To verify the advantages of the present invention, numerical simulations and analyses were carried out using the elasto-plastic finite element method.

Example 1

Test Conditions

Models for the FEM analysis were prepared based on coupling-type threaded joints for oil country tubular goods employing wedge threads. For the inventive example, a model of the threaded joint of the first embodiment shown in FIGS. 1 to 3 was prepared. For a comparative example, a model of a typical conventional threaded joint, in which the maximum outside diameter of the region of the sealing surface in the sealing head portion is smaller than the outside diameter of the neck portion at the thread machining start point, was prepared. The representative dimensions of each model are shown in Table 1.

TABLE 1

| Object | Item | Comparative Ex. | Inventive Ex. |
| --- | --- | --- | --- |
| Pin (Steel Pipe) | Outside diameter of tubular body | 194.8 [mm] | 193.68 [mm] |
| | Inside diameter of tubular body | 156.8 [mm] | 155.58 [mm] |
| | Diameter at thread machining start point | 171.7 [mm] | 182.9 [mm] |
| | Diameter of seal portion | 171.4 [mm] | 184.4 [mm] |
| | Taper angle of seal portion | 2.9 [°] | 7.0 [°] |
| | Wall thickness of seal portion | 4.6 [mm] | 14.3 [mm] |
| | Inside diameter of sealing head Portion | 163.0 [mm] | 155.5 [mm] |

TABLE 1-continued

| Object | Item | Comparative Ex. | Inventive Ex. |
| --- | --- | --- | --- |
| | Taper angle of male threaded Portion | 3.58 [°] | 2.39 [°] |
| | Length of male threaded portion | 150 [mm] | 155.4 [mm] |
| | Height of male threads | 2.8 [mm] | 2.5 [mm] |
| Box (Coupling) | Outside diameter of tubular body | 215.3 [mm] | 222.4 [mm] |
| | Inside diameter of tubular body | 161.9 [mm] | 155.21 [mm] |
| | Diameter of seal portion | 170.6 [mm] | 183.8 [mm] |
| | Taper angle of seal portion | 2.9 [°] | 2.9 [°] |
| | Wall thickness of seal portion | 13.5 [mm] | 19.3 [mm] |
| | Taper angle of female threaded Portion | 3.58 [°] | 2.39 [°] |
| | Length of female threaded portion | 150 [mm] | 155.4 [mm] |
| | Height of female threads | 2.8 [mm] | 2.6 [mm] |
| Joint | Clearance between pin end face and box | 5.45 [mm] | 2.0 [mm] |

The common conditions were as follows.
Size of threaded joint (steel pipe): 7⅝ [inch]×55.3 [lb./ft.]
Grade of steel pipe (pin) and coupling (box): API standard T95 (carbon steel having a yield stress of 95 [ksi] (655 [MPa])).

Evaluation Method

In the FEM analysis, a load sequence which simulated that in an ISO 13679 Series A test was applied to each model in a fastened state. In the analysis, the torque resistance performance was evaluated by using the values at the point of yielding (yield torque) in the torque chart and comparing the values. Furthermore, the sealing performance was evaluated by comparing the minimum values of the seal contact force of the sealing surfaces (the product of the average seal contact pressure and the seal contact width, of the sealing surfaces) in the internal pressure cycle (the first and second quadrants) and the external pressure cycle (the third and fourth quadrants) in the load sequence. (It is noted that the higher the minimum value of the average contact pressure, the better the sealing performance of the sealing surfaces.)

Test Results

Figure 5:
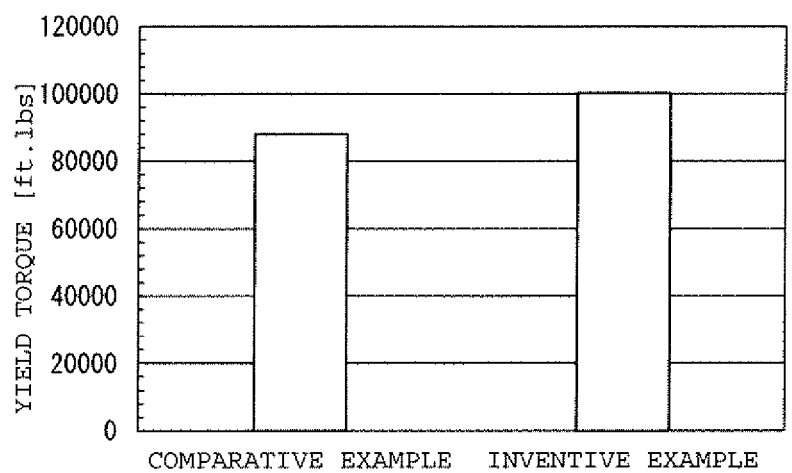
FIG. 5 is a diagram showing the results of evaluation of torque resistance performance in Example 1.
Figure 6:
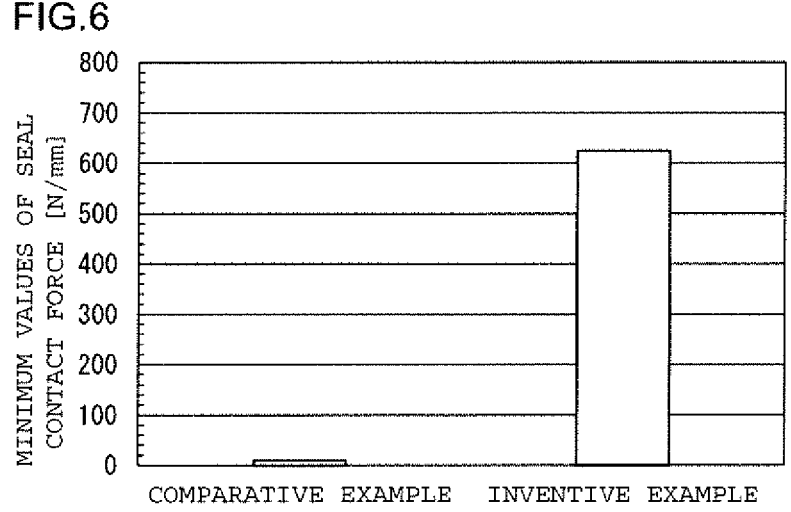
FIG. 6 is a diagram showing the results of evaluation of sealing performance in Example 1.

FIG. 5 is a diagram showing the results of evaluation of torque resistance performance in Example 1. FIG. 6 is a diagram showing the results of evaluation of sealing performance in Example 1. As shown in FIG. 5, high torque resistance performance was exhibited in both Inventive Example and Comparative Example. In Comparative Example, the contact between the sealing surfaces was lost as shown in FIG. 6. In contrast, Inventive Example showed markedly improved sealing performance.

Example 2

Test Conditions

Figure 7:
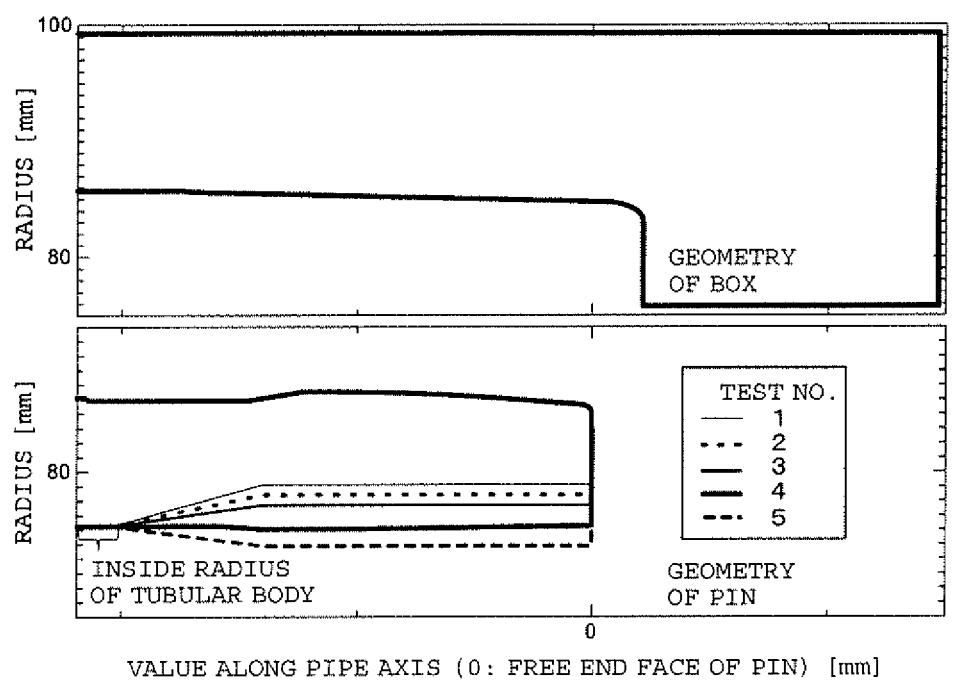
FIG. 7 is a schematic diagram showing a model of an FEM analysis in Example 2.
Figure 9:
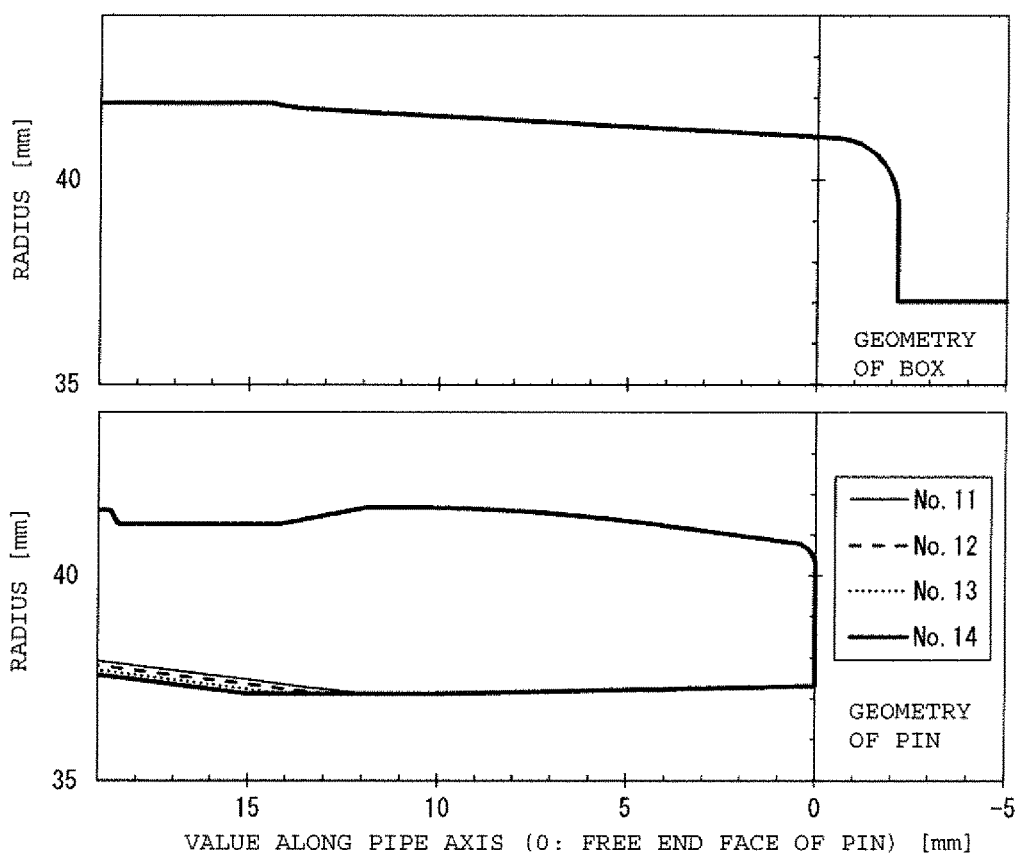
FIG. 9 is a schematic diagram showing a model of an FEM analysis in Example 3.

Models for the FEM analysis were prepared based on coupling-type threaded joints for oil country tubular goods employing wedge threads, with the geometries of the lip portions varied based on the threaded joints of the first and second embodiments shown in FIGS. 1 to 4. Specifically, as shown in FIG. 7, by varying the inside diameter of the sealing head portion, the wall thickness of the region of the sealing surface at a position of the maximum outside diameter in the sealing head portion relative to the wall thickness of the tubular body (hereinafter also referred to as the "wall thickness of the seal portion relative to the wall thickness of the tubular body") was varied to provide five different levels of wall thickness, namely, 50%, 56%, 61%, 74% and 83%. The representative dimensions of each model are shown in Table 2.

embodiment shown in FIGS. 1 to 3. Specifically, as shown in FIG. 9, the length of the head inner peripheral cylindrical surface was varied to provide four different levels of length,

TABLE 2

| Object | Item | Test No. | | | | |
|---|---|---|---|---|---|---|
| | | 1 | 2 | 3 | 4 | 5 |
| Pin (Steel Pipe) | Outside diameter of tubular body [mm] | | | 177.8 | | |
| | Inside diameter of tubular body [mm] | | | 152.5 | | |
| | Diameter at thread machining start point [mm] | | | 169.8 | | |
| | Diameter of seal portion [mm] | | | 170.9 | | |
| | Taper angle of seal portion [°] | | | 7.0 | | |
| | Wall thickness of seal portion relative to wall thickness of tubular body [%] | 50 | 56 | 61 | 74 | 83 |
| | Inside diameter of sealing head portion mm | 158.2 | 156.8 | 155.4 | 152.0 | 149.8 |
| | Taper angle of male threaded portion [°] | | | 1.79 | | |
| | Length of male threaded portion mm | | | 151.9 | | |
| | Height of male threads [mm] | | | 2.2 | | |
| Box (Coupling) | Outside diameter of tubular body [mm] | | | 198.2 | | |
| | Inside diameter of tubular body [mm] | | | 151.5 | | |
| | Diameter of seal portion [mm] | | | 170.3 | | |
| | Taper angle of seal portion [°] | | | 2.9 | | |
| | Wall thickness of seal portion [mm] | | | 13.9 | | |
| | Taper angle of female threaded portion [°] | | | 1.79 | | |
| | Length of female threaded portion [mm] | | | 151.9 | | |
| | Height of female threads [mm] | | | 2.3 | | |
| Joint | Clearance between pin end face and box [mm] | | | 2.0 | | |

The common conditions were as follows.
Size of threaded joint (steel pipe): 7 [inch]×35.0 [lb./ft.]
Grade of steel pipe (pin) and coupling (box): API standard L80 (carbon steel having a yield stress of 80 [ksi] (552 [MPa])).

The models of Test Nos. 1 to 3 are based on the threaded joint of the second embodiment shown in FIG. 4, each including a sealing head portion having an inside diameter larger than the inside diameter of the tubular body. The models of Test Nos. 4 and 5 are based on the threaded joint of the first embodiment shown in FIG. 3, each including a sealing head portion having an inside diameter smaller than the inside diameter of the tubular body.

Evaluation Method

As in Example 1, a load sequence which simulated that in an ISO 13679 Series A test was applied to each model in a fastened state, and the sealing performance was evaluated by comparing the minimum values of the seal contact force of the sealing surfaces.

Test Results

Figure 8:
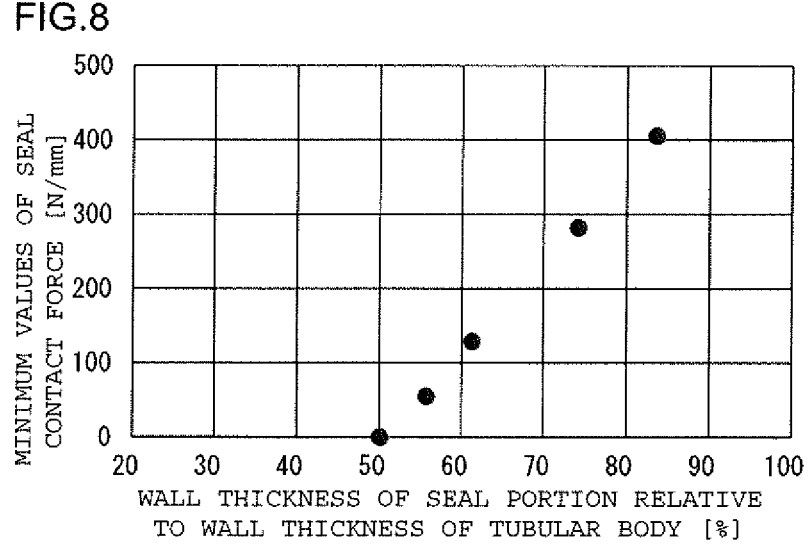
FIG. 8 is a diagram showing the results of evaluation of sealing performance in Example 2.

FIG. 8 is a diagram showing the results of evaluation of sealing performance in Example 2. The results shown in FIG. 8 demonstrate that, as the wall thickness of the seal portion relative to the wall thickness of the tubular body increases, i.e., the wall thickness of the lip portion increases, the sealing performance is improved. With regard to the extent of the increase of the wall thickness of the lip portion, in particular, it is seen that, when the wall thickness of the seal portion relative to the wall thickness of the tubular body is at least 55%, sufficient sealing performance is ensured.

Example 3

Test Conditions

Models for the FEM analysis were prepared based on coupling-type threaded joints for oil country tubular goods employing wedge threads, with the geometries of the lip portions varied based on the threaded joint of the first namely, 2 mm, 3 mm, 4 mm, and 5 mm. The representative dimensions of each model are shown in Table 3.

TABLE 3

| Object | Item | Test No. | | | |
|---|---|---|---|---|---|
| | | 11 | 12 | 13 | 14 |
| Pin (Steel Pipe) | Outside diameter of tubular body [mm] | | 88.9 | | |
| | Inside diameter of tubular body [mm] | | 76.0 | | |
| | Diameter at thread machining start point [mm] | | 82.6 | | |
| | Diameter of seal portion [mm] | | 83.3 | | |
| | Taper angle of seal portion [°] | | 7.0 | | |
| | Wall thickness of seal portion [mm] | | 4.5 | | |
| | Length of head inner peripheral cylindrical surface [mm] | 2 | 3 | 4 | 5 |
| | Inside diameter of sealing head portion [mm] | | 74.2 | | |
| | Taper angle of male threaded portion [°] | | 2.39 | | |
| | Length of male threaded portion [mm] | | 87.9 | | |
| | Height of male threads [mm] | | 1.25 | | |
| Box (Coupling) | Outside diameter of tubular body [mm] | | 98.1 | | |
| | Inside diameter of tubular body [mm] | | 74.1 | | |
| | Diameter of seal portion [mm] | | 82.9 | | |
| | Taper angle of seal portion [°] | | 2.9 | | |
| | Wall thickness of seal portion [mm] | | 7.6 | | |
| | Taper angle of female threaded portion [°] | | 2.39 | | |
| | Length of female threaded portion [mm] | | 87.9 | | |
| | Height of female threads [mm] | | 1.35 | | |
| Joint | Clearance between pin end face and box [mm] | | 2.0 | | |

The common conditions were as follows.
Size of threaded joint (steel pipe): 3½ [inch]×9.2 [lb./ft.]
Grade of steel pipe (pin) and coupling (box): API standard L80 (carbon steel having a yield stress of 80 [ksi] (552 [MPa])).

Evaluation Method

As in Examples 1 and 2, a load sequence which simulated that in an ISO 13679 Series A test was applied to each model in a fastened state, and the sealing performance was evaluated by comparing the minimum values of the seal contact force of the sealing surfaces.

Test Results

Figure 10:
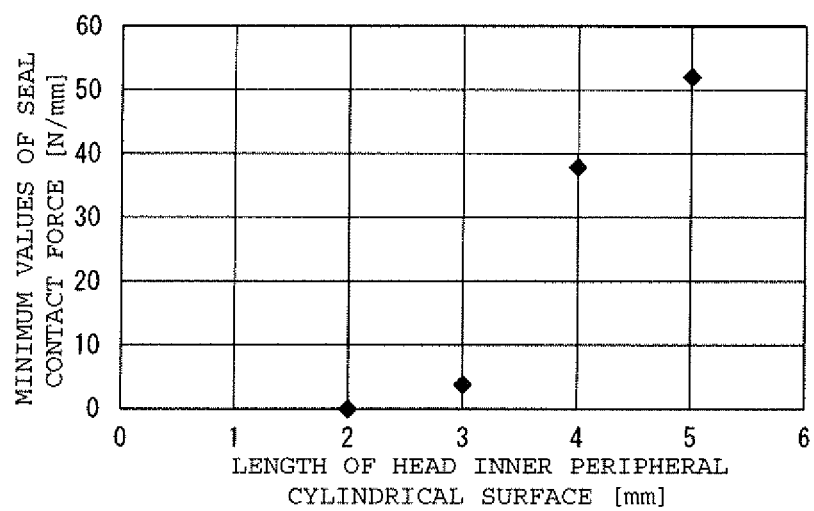
FIG. 10 is a diagram showing the results of evaluation of sealing performance in Example 3.

FIG. 10 is a diagram showing the results of evaluation of sealing performance in Example 3. The results shown in FIG. 10 demonstrate that, as the length of the head inner peripheral cylindrical surface increases, the sealing performance is improved. In particular, it is seen that, when the length of the head inner peripheral cylindrical surface is at least 3 mm, sufficient sealing performance is ensured.

INDUSTRIAL APPLICABILITY

A threaded joint according to the present invention is capable of being effectively utilized in connecting steel pipes that are used for extraction, production, or transport of underground resources. Examples of underground resources include fossil fuels such as crude oil, natural gas, shale gas, and methane hydrate, and also include gas or liquid underground resources such as ground water and hot springs.

| REFERENCE SIGNS LIST | |
|---|---|
| 10: pin, | 11: male threaded portion, |
| 11a: crest, | 11b: root, |
| 11c: load flank, | 11d: stabbing flank, |
| 12: lip portion, | 13: sealing surface, |
| 14: neck portion, | 15: sealing head portion, |
| 20: box, | 21: female threaded portion, |
| 21a: crest, | 21b: root, |
| 21c: load flank, | 21d: stabbing flank, |
| 22: recessed portion, | 23: sealing surface, |
| 30, 31: clearance, | |
| $D_1$: maximum outside diameter of region of sealing surface in sealing head portion, | |
| $D_2$: outside diameter of neck portion at boundary with male threaded portion, | |
| $d_1$: inside diameter of sealing head portion, | |
| $d_0$: inside diameter of tubular body, | |
| CL: pipe axis, | |
| $L_1$: length of sealing head inner peripheral cylindrical surface along pipe axis, | |
| $L_2$: length of sealing head inner peripheral foremost tapered surface along pipe axis. | |

The invention claimed is:

1. A threaded joint for steel pipes, comprising: a tubular pin and a tubular box, the pin and the box being fastened by screwing the pin onto the box,
the pin comprising, in order from a tubular body having the pin toward a free end thereof: a tapered male threaded portion with dovetail threads; and a lip portion including a sealing surface,
the box comprising: a tapered female threaded portion with dovetail threads corresponding to the male threaded portion of the pin; and a recessed portion corresponding to the lip portion, the recessed portion including a sealing surface,
wherein,
the lip portion includes, in order from the male threaded portion toward the free end of the pin: a neck portion; and a sealing head portion including the sealing surface,
the sealing surface is disposed on a region in the sealing head portion, the region having a maximum outside diameter that is larger than an outside diameter of the neck portion at a boundary between the neck portion and the male threaded portion,
the sealing head portion has an inside diameter that is smaller than an inside diameter of the tubular body, and
the lip portion has an inner peripheral surface, the inner peripheral surface including, in order from the free end of the pin:
a tapered surface increasing in diameter toward the free end of the pin;
a cylindrical surface that is continuous with the tapered surface; and
an inside tapered surface decreasing in diameter toward the free end of the pin,
wherein, in a fastened state, a clearance between an end face of the lip portion and the recessed portion of the box is in a range of 0.1 mm to 3.0 mm.

2. The threaded joint for steel pipes according to claim 1, wherein, the cylindrical surface has a length along the pipe axis of at least 3 mm, the length extending from a boundary between the tapered surface and the cylindrical surface.

3. The threaded joint for steel pipes according to claim 2, wherein,
in a fastened state, clearances are provided in at least one of the following: between crests of the male threaded portion and roots of the female threaded portion; and between roots of the male threaded portion and crests of the female threaded portion.

4. The threaded joint for steel pipes according to claim 1, wherein,
in a fastened state, clearances are provided in at least one of the following: between crests of the male threaded portion and roots of the female threaded portion; and between roots of the male threaded portion and crests of the female threaded portion.

5. The threaded joint for steel pipes according to claim 1, wherein,
the region of the sealing surface in the sealing head portion has a wall thickness at a position of the maximum outside diameter, the wall thickness being in a range of 55% to 80% of a wall thickness of the tubular body, and
the neck portion has a minimum wall thickness in a range of 45% to 70% of the wall thickness of the tubular body.

6. The threaded joint for steel pipes according to claim 1, wherein,
the male threaded portion and the female threaded portion each have a taper angle in a range of 1° to 5° with respect to the pipe axis.

7. The threaded joint for steel pipes according to claim 1, wherein,
the sealing surface of the lip portion includes a tapered surface, the tapered surface having a taper angle in a range of 3° to 10° with respect to the pipe axis.

8. The threaded joint for steel pipes according to claim 1, wherein,
the male threaded portion and the female threaded portion each have a thread height in a range of 1.0 mm to 3.0 mm.

9. A threaded joint for steel pipes, comprising: a tubular pin and a tubular box, the pin and the box being fastened by screwing the pin onto the box,
the pin comprising, in order from a tubular body having the pin toward a free end thereof: a tapered male threaded portion with dovetail threads; and a lip portion including a sealing surface,
the box comprising: a tapered female threaded portion with dovetail threads corresponding to the male threaded portion of the pin; and a recessed portion corresponding to the lip portion, the recessed portion including a sealing surface, wherein, the lip portion includes, in order from the male threaded portion toward the free end of the pin: a neck portion; and a sealing head portion including the sealing surface, the sealing surface is disposed on a region in the sealing head portion, the region having a maximum outside diameter that is larger than an outside diameter of the neck portion at a boundary between the neck portion and the male threaded portion, the sealing head portion has an inside diameter that is smaller than an inside diameter of the tubular body, and the lip portion has an inner peripheral surface, the inner peripheral surface including, in order from the free end of the pin:
- a tapered surface increasing in diameter toward the free end of the pin;
- a cylindrical surface that is continuous with the tapered surface; and
- an inside tapered surface decreasing in diameter toward the free end of the pin wherein, the neck portion has an outer peripheral surface, the outer peripheral surface being a cylindrical surface, and the sealing head portion has an outer peripheral surface, the outer peripheral surface including: a tapered surface that is continuous with the outer peripheral surface of the neck portion and increases in diameter at an angle in a range of 5° to 20° with respect to the pipe axis; a cylindrical surface that is continuous with the tapered surface; and the sealing surface, the sealing surface including a curved surface that is continuous with the cylindrical surface and a tapered surface that decreases in diameter toward the free end of the pin.

10. The threaded joint for steel pipes according to claim 9, wherein, the cylindrical surface has a length along the pipe axis of at least 3 mm, the length extending from a boundary between the tapered surface and the cylindrical surface.

11. The threaded joint for steel pipes according to claim 10, wherein, in a fastened state, clearances are provided in at least one of the following: between crests of the male threaded portion and roots of the female threaded portion; and between roots of the male threaded portion and crests of the female threaded portion.

12. The threaded joint for steel pipes according to claim 9, wherein, in a fastened state, clearances are provided in at least one of the following: between crests of the male threaded portion and roots of the female threaded portion; and between roots of the male threaded portion and crests of the female threaded portion.

13. The threaded joint for steel pipes according to claim 9, wherein, the region of the sealing surface in the sealing head portion has a wall thickness at a position of the maximum outside diameter, the wall thickness being in a range of 55% to 80% of a wall thickness of the tubular body, and the neck portion has a minimum wall thickness in a range of 45% to 70% of the wall thickness of the tubular body.

14. The threaded joint for steel pipes according to claim 9, wherein, the male threaded portion and the female threaded portion each have a taper angle in a range of 1° to 5° with respect to the pipe axis.

15. The threaded joint for steel pipes according to claim 9, wherein, the sealing surface of the lip portion includes a tapered surface, the tapered surface having a taper angle in a range of 3° to 10° with respect to the pipe axis.

16. The threaded joint for steel pipes according to claim 9, wherein, the male threaded portion and the female threaded portion each have a thread height in a range of 1.0 mm to 3.0 mm.

* * * * *